United States Patent Office 3,845,151
Patented Oct. 29, 1974

3,845,151
ADSORPTIVE SEPARATION OF PINENE ISOMERS WITH ADSORBENTS CONTAINING AN AROMATIC HYDROCARBON SUBSTRATE
James W. Priegnitz, Elgin, Ill., assignor to Universal Oil Products Company, Des Plaines, Ill.
No Drawing. Filed Nov. 1, 1973, Ser. No. 411,977
Int. Cl. C01b 33/28; C07c 7/12, 13/00; C09f 3/02
U.S. Cl. 260—675.5                           23 Claims

ABSTRACT OF THE DISCLOSURE

A process for the separation of alpha- and beta-pinene from a feed mixture containing the two isomers which employs a crystalline aluminosilicates adsorbent containing a particular cation or cations at the exchangeable sites and an aromatic hydrocarbon substrate selected from the group consisting of benzene and benzene homologues having a boiling point less than that of the pinene isomers, to selectively adsorb one of the isomers from the feed mixture. The feed stock contacts the adsorbent which allows one isomer from the feed mixture to be selectively adsorbed and the adsorbed isomer is thereafter recovered from the adsorbent in a more concentrated form as compared to its concentration in the feed stock. The aromatic hydrocarbon substrate improves the desorption rates of the isomers from the adsorbent as compared to those obtained with an adsorbent with no substrate and eliminates tailing of one pinene isomer into the other which occurs with an adsorbent with no substrate.

A specific example of the process disclosed herein is a process which comprises the steps of: contacting the feed mixture at adsorption conditions with a crystalline aluminosilicate adsorbent selected from the group consisting of type X and type Y zeolites containing a selected cation or cations at the exchangeable sites within the zeolite and containing an aromatic hydrocarbon substrate selected from the group consisting of benzene and benzene homologues having a boiling point less than that of the pinene isomers, thereby selectively adsorbing beta-pinene; withdrawing from the adsorbent a stream comprising less selectively adsorbed alpha-pinene; contacting the adsorbent at desorption conditions with a desorbent material to effect the removal of beta-pinene from the adsorbent; and, withdrawing from the adsorbent a stream comprising desorbent material and beta-pinene.

BACKGROUND OF THE INVENTION

Field of the Invention

The field of art to which the claimed invention pertains is solid-bed adsorptive separation. More specifically, the claimed invention relates to a process for the separation of pinene isomers using a particular solid adsorbent containing a specific aromatic hydrocarbon substrate which selectively removes one of the isomers from a feed mixture.

Description of the Prior Art

It is well known in the separation art that certain crystalline aluminosilicates can be used to separate hydrocarbon species from mixtures thereof. In particular, the separation of normal paraffins from branched chained paraffins can be accomplished by using the type A zeolites which have pore openings from 3 to about 5 angstroms. Such a separation process is disclosed for example in U.S. Pats., 2,985,589 and 3,201,491. These adsorbents allow a separation based on the physical size differences in the molecules by allowing the smaller or normal hydrocarbons to be passed into the cavities within the crystalline aluminosilicates adsorbent, while excluding the larger or branched chain molecules.

U.S. Pats. 3,265,750 and 3,510,423 for example disclose processes in which larger pore diameter zeolites such as the type X or type Y structured zeolites can be used to separate olefinic hydrocarbons.

In addition to separating hydrocarbon types, the type X or type Y zeolite have also been employed in processes to separate individual hydrocarbon isomers. In the process described in U.S. Pats. 3,558,730; 3,558,732; 3,626,020 and 3,686,342 for example they are used to separate desired xylene isomers; in U.S. Pat. 3,668,267 they are used to separate particular alkyl substituted naphthalenes.

It has also been recognized that certain compounds when contacted with zeolitic adsorbents will modify the characteristics of these adsorbents. For example, U.S. Pat. 3,106,593 teaches the use of $NH_3$ or basic nitrogen compounds such as amines to inhibit polymerization which may occur in the separation of olefins with certain adsorbents; U.S. Pat. 3,698,157 teaches the use of an organic-radical substituted silane to modify the characteristics of a particular zeolite useful in separating individual $C_8$ aromatic isomers; and U.S. Pat. 3,734,974 disclosed the addition of small amounts of water to a particular adsorbent useful for xylene separation to improve exchange rates and to reduce ortho- and meta-xylene "tailing."

The present invention relates to a process for the separation of the isomeric bicyclic terpenes alpha- and beta-pinene using a particular adsorbent modified by a specific aromatic hydrocarbon substrate.

I have found that type X and type Y structured crystalline aluminosilicate zeolites containing one or more selected cations at the exchangeable sites and containing an aromatic hydrocarbon substrate selected from the group consisting of benzene and benzene homologues having a boiling point less than that of the pinene isomers exhibit characteristics which make it possible to separate pinene isomers into at least one high-purity isomer stream by solid-bed selective adsorption. The prior art has neither disclosed nor suggested a process by which the highly reactive isomer bicyclic terpenes alpha- and beta-pinene can be separated with such a zeolitic adsorbent.

SUMMARY OF THE INVENTION

It is accordingly, a broad objective of my invention to provide a process for the separation of alpha- and beta-pinene from a feed mixture containing these isomers.

In brief summary my invention is, in one embodiment, a process for separating pinene isomers from a feed mixture containing them which process comprises contacting the mixture with a crystalline aluminosilicate selected from the group consisting of type X structured and type Y structured zeolites containing one or more selected cations at exchangeable cationic sites within the zeolite and containing an aromatic hydrocarbon substrate selected from the group consisting of benzene and benzene homologues having a boiling point less than that of the pinene isomers, thereby selectively adsorbing at adsorption conditions one of the isomers from said feed and thereafter recovering the selectively adsorbed isomer.

The process of this invention provides a superior alternative to distillation and gas chromatography separation techniques for the separation of mixtures of pinenes into relatively high purity alpha- and beta-pinene fractions. Beta-pinene in particular finds specific use in the fragrance industry as a starting material in the manufacture of aroma chemicals.

Other embodiments and objects of the present invention encompass details about feed mixtures, adsorbents, substrates, desorbents and operating conditions all of which are hereinafter disclosed in the following discussion of each of these facets of the present invention.

DESCRIPTION OF THE INVENTION

With boiling points of 156° C. and 165° C. respectively for alpha- and beta-pinene the isomers can of course be separated by distillation. As will be further described below, however, by the selective adsorption process of our invention a selectivity value of greater than 2 can be obtained as compared to the relative volatility factor of 1.3 that exists between the two isomers. The process of our invention thus offers a more efficient method of separating these two isomers into at least one high purity fraction of alpha- or beta-pinene.

Alpha-pinene is one of the most important hydrocarbons of the entire terpene family and it is found in nearly all essential oils. The most common source of pinene is turpentine with alpha- and beta-pinene constituting the major components. Turpentine varies somewhat in composition, depending upon its source, but consists principally of alpha-pinene together with varying amounts of beta-pinene. It is contemplated therefore that turpentine will be the most common feed mixture for the process of our invention. Feed mixtures to our process may contain as diluents components other than the pinene isomers which are generally less selectively adsorbed (if at all) in this adsorption system and in which the pinenes are soluble.

Adsorbents which can be used in the process of this invention are generally referred to as crystalline aluminosilicates or molecular sieves and can comprise both the natural and synthetic aluminosilicates. Particular crystalline aluminosilicates encompassed by the present invention include aluminosilicate cage structures in which the alumina and silica tetrahedra are intimately connected in an open three dimensional network. The tetrahedra are crosslinked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecule sizes. In the process of this invention, however, the term molecular sieves is not strictly suitable since the separation of isomers is dependent on electrochemical attraction of different isomer configurations rather than pure physical size differences in the isomer molecules.

In hydrated form, the crystalline aluminosilicates generally encompass those zeolites represented by the formula 1 below:

Formula 1

$$M_{2/n}O:Al_2O_3:wSiO_2:yH_2O$$

where "M" is a cation which balances the electrovalence of the tetrahedra and is generally referred to as an exchangeable cationic site, "n" represents the valence of the cation, "w" represents the moles of SiO$_2$ and "y" represents the moles of water. The cations may be any one of a number of cations which will be hereinafter described in detail.

The type X structured and type Y structured zeolites as used in this specification shall include crystalline aluminosilicates having a three dimensional interconnected cage structure and can be specifically defined by U.S. Pats. 2,882,244 and 3,130,007. The terms "type X structured" and "type Y structured" zeolites shall include all zeolites which have a general structure as represented in the above two cited patents and specifically include those structured containing various cations exchanged upon the zeolites.

The type X structured zeolites can be represented in terms of mole oxides as represented in formula 2 below:

Formula 2

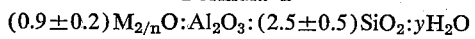

where "M" represents at least one cation having a valence of not more than 3, "n" represents the valence of "M" and "y" is a value up to about 4 depending upon the identity of "M" and the degree of hydration of the crystalline structure.

The type Y structured zeolite can be represented in terms of the mole oxides for the sodium form as represented by formula 3 below:

Formula 3

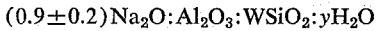

where "W" is a value of greater than about 3 up to 8, and "y" may be any value up to about 9.

Adsorbents contemplated herein include not only the sodium form of the type Y zeolite but also crystalline materials obtained from such a zeolite by partial or complete replacement of the sodium cation with other individual cations or group of cations. Similarly, the type X zeolite also may be ion-exchanged.

Cationic or base exchange methods are generally known to those familiar with the field of crystalline aluminosilicate production. They are g'nerally performed by contacting the zeolite with an aqueous solution of the soluble salt of the cation or cations desired to be placed upon the zeolite. The desired degree of exchange takes place before the sieves are removed from the aqueous solution, washed and dried to a desired water content. It is contemplated that cation exchange operations may take place using individual solutions of desired cations placed on the zeolite or using an exchange solution containing a mixture of cations, where two or more desired cations are placed on the zeolite.

The cations which may be placed upon the zeolite include cations selected from, but not limited to the Group I-A, Group II-A and Group I-B metals. Suecific cations which show a preferential selectivity for beta-pinene with respect to alpha-pinene isomers include lithium, sodium, potassium, rubidium, cesium, beryllium, magnesium, calcium, strontium, and barium. Where the above cations are used, beta-pienene would be the preferentially adsorbed component of the feed mixture. In the process of this invntion we have found that the type X or type Y zeolites containing sodium or barium or potassium as the selected single cation are particularly preferred.

The following combinations of cations have also been shown to be suited for the separation of pinene isomers. The cation combinations include potassium and barium, potassium and beryllium, potassium and manganese, rubidium and barium, cesium and barium, copper and cadmium, copper and silver, zinc and silver, and copper and potassium, with the barium and potassium combination being particularly preferred.

When singular cations are based exchanged upon a zeolite the singular cations can comprise anywhere from 5 up to 75 wt. percent on a relative volatile free basis of the zeolite depending upon the molecular weight of the material exchanged upon the zeolite. It is contemplated that when single ions are placed upon the zeolite that they may be on the zeolite in concentrations of from about 1% to about 100% of the original cations present (generally sodium) upon the zeolite prior to its being ion-exchanged. By knowing the empirical formula including the silica to alumina ratio of the zeolite used, its water content, and the percentage of binder used if any, it is possible to calculate the percentage of ion exchange that has taken place.

When two or more cations are placed upon the zeolite there are two parameters in which one can operate in order to effectively produce a zeolite having the maximum selective properties. One of the parameters is the extent of the zeolite ion exchange which is determined by the length of time, temperature and cation concentration. The other parameter is the ratio of individual cations placed on the zeolite. In instances in which the cation pairs comprise a Group I-A metal and a Group II-A metal the weight ratio of these two respective components upon the zeolite can vary anywhere from about less than one up to about one hundred depending upon the molecular weight of the Group I–A or Group II–A metal.

Because of the highly reactive nature of the pinenes it is very important that the adsorbent possess little or no catalytic activity toward pinene polymerization or isomerization which would either degrade the product quality, reduce the overall yield of desired product or possibly degrade adsorbent performance. We have found that the isomerization effects of the adsorbent are of primary concern. Unless the adsorbent possesses little or no isomerization activity, beta-pinene will be converted apparently to alpha-pinene and dipentene. It is thought that such activity is due primarily to the presence of hydrogen cations within the zeolite or the binder used to produce the adsorbent particles. We have discovered that ion exchanging the type X or type Y zeolitic adsorbent with a dilute aqueous solution of sodium or potassium hydroxide eliminates such acid sites and produces an adsorbent with little or no catalytic activity. This ion-exchange step may then be followed by further ion-exchanges as desired. During any subsequent ion-exchange steps and washes it is important that the pH of the exchange medium be maintained at or above 7 to avoid re-creating acid sites.

The chemical analyses such as cation concentrations performed on the zeolites are generally reported on a volatile-free basis which is determined by taking into account the amount of material lost upon a relatively high-temperature calcination and correcting the individual chemical analysis in weight percent to take this factor into consideration. The volatile matter content (generally water) of the zeolitic adsorbent is determined by first weighing the adsorbent and thereafter contacting the adsorbent in a high temperature furnace at 900° C. under an inert purge gas stream such as nitrogen for a period of time sufficient to achieve a constant weight. The sample is then cooled under an inert atmosphere and weighed to determine the difference in weight between the adsorbent before it was passed into the oven and afterwards. The difference in weight is calculated as a loss on ignition (LOI) and represents the volatile matter present within the adsorbent. A specific example would be a 100 gram sample of the zeolitic adsorbent placed into a muffle furnace at about 900° C. for a period of 5 to 6 hours with a dry nitrogen purge gas passing over the zeolite. The zeolite is then removed from the furnace, cooled under an inert atmosphere, and reweighed yielding a total weight of about 95 grams. On this basis, the original adsorbent can be said to have contained 5 wt. percent volatile matter.

The flow schemes which can be utilized to effect the process of this invention include batch type fixed bed systems, the continuous simulated moving-bed systems and the moving-bed systems. In the batch operating processes the feed stock is passed into an adsorbent chamber and contacts with the adsorbent at adsorption conditions for a predetermined period of time after which the feed is stopped and any remaining feed present between the adsorbent particles can be purged out of the chamber. A desorbent material may then be passed into the chamber to help remove the selectively adsorbed isomer from the adsorbent. In the continuous fixed bed or moving bed processes, the adsorption and desorption operations are continuously taking place which allows both continuous production of a stream enriched in the desired feed isomer and the continual use of feed and desorbent streams.

One especially preferred processing flow scheme which can be utilized to effect the separation of pinene isomers by selective adsorption on a solid adsorbent includes what is known in the art as the simulated moving-bed countercurrent system. The general operating sequence of such a flow system is described in U.S. Pat. 2,985,589. A preferred general embodiment of our invention therefore is a process using this flow scheme and a particular adsorbent for the separation of pinene isomers. Specifically, one embodiment of our invention is a process for separating pinene isomers which process comprises the steps of: contacting said mixture at adsorption conditions with a particular zeolitic adsorbent containing an aromatic hydrocarbon substrate consisting of benzene and benzene homologues having a boiling point less than that of the pinene isomers, thereby selectively adsorbing one of the pinene isomers; withdrawing from the adsorbent bed a stream comprising the less selectively adsorbed isomer in the feed; contacting the adsorbent at desorbent conditions with a desorbent material to effect the removal of the selectively adsorbed isomer from the adsorbent; and, withdrawing from the adsorbent a steam comprising desorbent material and the selectively adsorbed isomer.

The more selectively adsorbed feed component is commonly referred to as the extract component of the feed stock and the non-selectively adsorbed feed components are referred to as the raffinate components. In the process of this invention beta-pinene will usually be the more selectively adsorbed feed component and hence the extract component of the feed stock while alpha-pinene will be less selectively adsorbed and hence comprise a raffinate component of the feed stock.

Although adsorption and desorption conditions can be either liquid or vapor phase or liquid and vapor phase, the liquid phase operations for both adsorption and desorption are preferred because of the lower temperature requirements and the slightly improved selectivities with the lower temperatures.

Because of the very reactive nature of the pinenes we have found the range of process temperatures for both adsorption and desorption is somewhat critical. We have found that at temperatures much above 150° F. the two isomers are converted into unidentified products. The preferred temperature range for both adsorption and desorption is therefore from about 70° F. to about 150° F.

While subatmospheric pressures could be employed, preferred pressures for both adsorption and desorption includes those in the range of about above atmospheric to about 500 p.s.i.g. Higher pressure operations do not appear to affect the selectivity to a measurable amount and additionally increase the cost of equipment. Desorption and adsorption will preferably be conducted within the same range of temperatures and pressures. The desorption of the selectively adsorbed isomer could however be effected at somewhat reduced pressures or elevated temperatures or both from those employed during adsorption.

The term "desorbent material" as used herein means any substance capable of removing the selectively adsorbed isomer from the adsorbent to allow recovery of the adsorbed isomers. Liquid desorbent materials in particular are generally carefully selected so that desorption of the adsorbed isomer can be achieved with reasonable mass flow rates and also so that the desorbent can in turn be replaced by the more selectively adsorbed feed isomer in a subsequent adsorption step.

Desorbent materials which can be used in the process of this invention should be substances which are easily separable from the feed mixture that is passed into the process because in desorbing the preferentially adsorbed component of the feed both desorbent and the desorbed feed component are removed from the adsorbent in admixture. Without a method of separation of these two materials, the purity of the selectively adsorbed component of the feed stock would not be very high since it would be diluted with desorbent. It is therefore contemplated that desorbent materials having a different boiling range than the feed mixture used should be used in this process. The use of a desorbent material having a different boiling range than that of the feed allows a simple separation by fractionation or other methods to remove desired feed components from the desorbent and allow reuse of the desorbent in the process. If fractionation is employed to separate the desorbent material from the pinene isomers it is preferred that the desorbent material used in the process have a boiling range lower rather than higher than that of the pinene isomers. With a lower-boiling desorbent lower fractionation temperatures can be used thus minimizing the conversion of the reactive pinene isomers to other compounds.

Desorbent materials which can be used in the process of this invention include paraffins, olefins, aromatics, ethers, alcohols, cyclic dienes and the ketones all of which are preferred to have lower boiling points than the pinenes. Particularly preferred desorbent materials are linear olefins especially those having from about 4 to 8 carbon atoms per molecule or mixtures of such olefins and paraffins of the same carbon number range. Although we are not primarily concerned in this application with this manner of desorption, gaseous materials such as nitrogen, hydrogen, methane, ethane, etc. could also be used as a desorbent material where the desorption operation takes place by a purging step.

With the type of processes employing adsorbents to separate pinene isomers by selective adsorption now in mind, one can appreciate that certain characteristics of adsorbents are highly desirable, if not absolutely necessary, to the successful operation of the selective adsorption process. Among such characteristics are: the adsorptive capacity for some volume of the desired isomer per volume of adsorbent; the selective adsorption for one pinene isomer with respect to the other isomers and the desorbent; little or no catalytic activity for undesired reactions such as polymerization and isomerization; and, reasonably fast rates of desorption of the pinene isomers from the adsorbent with no "tailing" of one isomer into the other.

Capacity of the adsorbent for adsorbing a specific volume of one of the pinene isomers is of course a necessity; without such capacity the adsorbent is useless for adsorptive separation. Furthermore, the higher the adsorbent's capacity for the component to be adsorbed, the better is the adsorbent. Increased capacity of a particular adsorbent makes it possible to reduce the amount of adsorbent needed to separate the desired component contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life.

The other necessary adsorbent characteristic is the ability of the adsorbent to separate components of the feed, or, in other words, the selectivity, (B), of the adsorbent for one component as compared to another component. Selectivity can be expressed not only for the desired pinene isomer as compared to the other isomers but can also be expressed between any feed stream isomer and the desorbent. The selectivity, (B), as used throughout this specfication is defined as the ratio of the two components of the adsorbed phase over the ratio of the same two components in the unadsorbed phase at equilibrium conditions.

Selectivity is shown as Equation 1 below:

Equation 1

$$\text{Selectivity} = (B) = \frac{[\text{Vol. percent } C/\text{vol. percent } D]_A}{[\text{Vol. percent } C/\text{vol. percent } D]_U}$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent. In other words, there was no net transfer of material occurring between the unadsorbed and adsorbed phases.

As can be seen where the selectivity of two components approaches 1.0 there is no preferential adsorption of one component by the adsorbent. As the (B) becomes less than or greater than 1.0 there is a preferential selectivity by the adsorbent of one component. When comparing the selectivity of the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

It is also necessary that the adsorbent possess little or no catalytic activity toward polymerization or isomerization of the pinene isomers. Such activity might affect adsorbent capacity or selectivity or product yield or all of these. Polymerization tends primarily to degrade the adsorbent in addition to reducing the yields somewhat. Polymerization effects are generally considered to be primarily physical impediments which obstruct the surface of the adsorbent and the pores present in the structure of the adsorbent, thereby affecting the adsorbent's ability to selectively adsorb one of the pinene isomers. This shortens the useful life of the adsorbent and makes necessary frequent regeneration treatments to restore the adsorptive properties of the adsorbent. Isomerization activity tends primarily to decrease the yield of the desired isomer and it is the elimination of this activity which we have found to be of primary concern rather than polymerization activity in the process of our invention. It is, therefore, extremely important that the catalytic activity be substantially reduced or preferably totally eliminated by proper methods of manufacture of a selected adsorbent. While reducing the temperature of the operations of the adsorption process in which the catalytic activity is present will substantially reduce the catalytic activity because of the associated reduction in the rate of reaction, this procedure in adsorptive separation processes employing molecular sieves is generally not desirable because the reduction in temperature also reduces the rates of adsorption and desorption of the selectively adsorbed isomer.

The remaining important characteristic of the adsorbent, especially one used for the separation of pinene isomers, is that it permit reasonably fast desorption rates of the pinene isomers from the adsorbent. Normally in solid-bed selective adsorption processes slow desorption rates can be increased by increasing the desorption temperature but becaue of the reactive nature of the pinene isomers there is in this process an upper limit at which desorption (and adsorption) can take place. As previously mentioned this maximum is about 150° F. The ease with which the pinene isomers are desorbed can be measured by the quantity of desorbent material required to accomplish a desired degree of desorption. This quantity of desorbent is in turn a factor in the cost of the separation process since desorbent material must be purchased as initial inventory, pumped into the adsorbent chamber and separated from the extract and raffinate stream for reose. It is therefore desirable that the desorbent material requirement be as low as possible.

As a related problem, unless the desorption rates are sharp, the less selectively adsorbed alpha-pinene isomers will "tail" into the more selectively adsorbed beta-pinene as beta-pinene is desorbed from the adsorbent. This can affect the purity of the beta-pinene obtained from the extract stream and impose a purity limitation on the beta-pinene product. Tailing can occur even though a very reasonable amount of desorbent material has removed the bulk of the alpha-pinene or beta-pinene from the adsorbent.

I have discovered that when a feed mixture containing alpha- and beta-pinene is contacted at adsorption conditions with certain zeolitic adsorbents containing an aromatic hydrocarbon substrate that the desorption rate of the selectively adsorbed beta-pinene from the adsorbent improves as compared to the rate obtained using an adsorbent with no substrate and that tailing of alpha-pinene into beta-pinene is eliminated.

More specifically I have discovered that the "tailing" of alpha-pinene into the desorption of the beta-pinene is due to one specific optical configuration of alpha-pinene. Two feed blends, one containing (+)-alpha-pinene and the other containing (−)-alpha-pinene were prepared and tested in place of a feed blend containing dl-alpha-pinene which exhibited tailing. When the feed blends were individually tested by a pulse test (hereinafter described in more detail) using an adsorbent containing no substrate it was found that the (+)-alpha-pinene optical isomer exhibits "tailing" and the (−)-alpha-pinene isomer does possible configurations rather than direction of rotation). It appears that the adsorbent contains some sites which have a small selectivity for the plus optical isomer. This could also account for the tailing of beta-pinene. When particular aromatic hydrocarbon substrates are employed the tailing is eliminated.

The term "substrate" as used in this specification has, in one sense, its usual meaning of "any substance acted upon"; it can be thought of here as a substance acted upon by the pinene isomers. Additionally, in this specification, it has the broad meaning of "any modifying or activating substance". In this context it is a substance which modifies certain adsorbent characteristics. The term as used herein has both of these meanings because the exact mechanism by which certain aromatic hydrocarbons modify adsorbent characteristics is not fully understood. It is thought that they modify the acidity/basicity relationships that exist among certain adsorbents and both feed and desorbent materials contacting such adsorbents, and by this means effect changes in adsorbent characteristics.

Table 1 below shows the normal boiling points of benzene and various benzene homologues along with those of alpha- and beta-pinene for comparison.

TABLE 1

Normal Boiling Points of Benzene and Selected Benzene Homologues

| Compound | Normal boiling point, °C. |
|---|---|
| Benzene | 80 |
| Toluene | 111 |
| Ethylbenzene | 136 |
| Para-xylene | 138 |
| Meta-xylene | 139 |
| Ortho-xylene | 144 |
| Isopropylbenzene | 152 |
| n-Propylbenzene | 159 |
| Ortho-cymene | 175 |
| Meta-cymene | 176 |
| Para-cymene | 176 |
| Alpha-pinene | 156 |
| Beta-pinene | 165 |

The process of this invention is concerned only with those aromatic hydrocarbon substrates selected from the group consisting of benzene and benzene homologues having a boiling point less than that of the pinene isomers. The reason for this selection is because aromatic substrates do not appear to be permanent on the adsorbent and it is therefore desired that they be as easily separable from the feed components in the extract or raffinate streams as is the desorbent material. Thus n-propylbenzene and the cymene isomers which have boiling points higher than alpha-pinene as shown in Table 1 are excluded from use as a substrate in the process of this invention.

It is, moreover, desired that the substrate be separable from the pinene isomers at temperatures sufficiently low to avoid degradation of the very reactive pinene isomers. For this reason benzene is particularly preferred for use as a substrate because its boiling point is the farthest from that of the pinenes.

I have discovered that the amount of substrate necessary to achieve the desired results is quite critical within a rather narrow range. Excessive amounts of substrate can severely reduce or destroy the selectivity of the adsorbent for one pinene isomer with respect to the other. The effective concentration necessary to achieve the desired results I have found is from about 0.05 to about 0.5 wt. percent of the adsorbent. This range then is the preferred concentration range of substrate. For this reason, plus the fact that the substrates do not appear to be permanent on the adsorbent, it is preferred that the substrate be added to the adsorbent on an intermediate or continuous basis to maintain the effective concentration of substrate on the adsorbent. The particular substrate can be added by itself but more preferably will be contained in the feed stock or desorbent material in amounts sufficient to maintain the effective concentration.

In order to test various adsorbents to measure the characteristics of adsorptive capacity and selectivity, a dynamic testing apparatus is employed. The apparatus consists of an adsorbent chamber of approximately 70 cc. volume having inlet and outlet portions at opposite ends of the chamber. The chamber is contained within a temperature control means and, in addition, pressure control equipment is used to operate the chamber at a constant predetermined pressure. Chromatographic analysis equipment can be attached to the outlet line of the chamber and used to analyze the effluent stream leaving the adsorbent chamber.

A pulse test, performed using this apparatus and the following general procedure, is used to determine selectivities and other data for various adsorbent systems. The adsorbent is filled to equilibrium with a particular desorbent by passing the desorbent through the adsorbent chamber. At a convenient time, a pulse test of feed containing known concentrations of the pinene isomers is injected for a duration of several minutes. For convenience a known concentration of a non-adsorbed tracer such as n-nonane may be included in the feed. Desorbent flow is resumed, and the tracer (if one is employed) and the pinene isomers are eluted as in liquid-solid chromatographic operation. The effluent can be analyzed by on-stream chromatographic equipment and traces of the envelopes of corresponding component peaks developed. Alternatively, effluent samples can be collected periodically and later analyzed separately by gas chromatography.

From information derived from the chromatographic traces, adsorbent performance can be rated in terms of capacity index for the adsorbent isomer, selectivity for one pinene isomer with respect to the other, and the rate of desorption of adsorbed isomer by the desorbent. The capacity index is characterized by the distance between the center of the peak envelope of the selectively adsorbed isomer and the peak envelope of the tracer component or some other known reference point. It is expressed in terms of the volume in cubic centimeters of desorbent pumped during this time interval. Selectivity, (B), for the adsorbed isomer with respect to the non-adsorbed isomer is characterized by the ratio of the distance between the center of the adsorbed isomer peak envelope and the tracer peak envelope (or other reference point) to the corresponding distance for the other (non-adsorbed) isomer. The rate of exchange of the adsorbed isomer with the desorbent can generally be characterized by the width of the peak envelope at half intensity; the narrower the peak width the faster the desorption rate. The desorption rate can also be characterized by the distance between the center of the tracer peak envelope and the disappearance of the selectively adsorbed isomer which has just been desorbed. This distance is again the volume of desorbent pumped during this time interval.

To translate this type of data into a practical pinene separation process requires actual testing of the best system in a continuous countercurrent liquid-solid contacting testing device. The general operating principles of such a device have been previously described and are found in Broughton U.S. Pat. 2,985,589. A specific laboratory-size apparatus utilizing these principles is described in de Rosset et al. U.S. Pat. 3,706,812. The equipment comprises multiple adsorbent beds with a number of access lines attached to distributors within the beds and terminating at a rotary distributing valve. At a given valve position, feed and desorbent are being introduced through two of the lines and raffinate and extract are being withdrawn through two more. All remaining access lines are inactive and when the position of the distributing valve is advanced by one index all active positions will be advanced by one bed. This simulates a condition in which the adsorbent physically moves in a direction countercurrent to the liquid flow.

The decreased "tailing" which was demonstrated by pulse test results, was confirmed by continuous testing in the laboratory-sized apparatus described above.

The following examples are presented to further illustrate the basis and benefit of the present invention and are not intended to limit the scope of the invention.

EXAMPLE I

This examples presents results of pulse tests which were performed using a particular adsorbent primarily to determine selectivities of the adsorbent for one pinene isomer relative to the other with various desorbent materials. The selectivity numbers illustrate the adsorbent's ability to separate the pinene isomers.

The adsorbent was a Type X structured zeolite which contained a small portion of binder material and was approximately 20–40 mesh particle size.

A sodium form Type X structured zeolite has been ion-exchanged first with a dilute aqueous caustic solution for the purpose of eliminating catalytic activity of the final adsorbent. The zeolite was then ion-exchanged with a potassium chloride solution to give a volatile-free potassium oxide content of about 9 wt. percent and the adsorbent was adjusted to a water level of 1.4 wt. percent before it was utilized in the pulse test apparatus. The adsorbent was placed in a 70 cc. adsorbent column which was maintained at 45 or 54° C. with constant pressure of 60 p.s.i.g. during the entire operation. The column effluent was sampled every 2.5 minutes by an automatic sampling chromatograph.

The feed mixture utilized contained 5 vol. percent n-nonane, 17 vol. percent beta-pinene and 78 vol. percent alpha-pinene and was injected via a sample loop into the test column in pulses of 3.6 cc. each. Desorbent materials used comprised the following: a blend of 30 vol. percent hexene-1 and 70 vol. percent iso-pentane; a blend of 50 vol. percent hexene-1 and 50 vol. percent iso-pentane; and 100 vol. percent hexene-1.

The effluent was analyzed by the on-stream chromatographic equipment and traces of the envelopes of component peaks were developed.

Form information derived from the chromatographic traces, selectivities of the adsorbent for beta-pinene with respect to alpha-pinene and the volume of desorbent necessary to desorb beta-pinene were obtained in the manner previously described. Results for four tests, A, B, C and D are shown in Table 2.

TABLE 2.—PINENE SEPARATION PULSE TEST RESULTS WITH VARIOUS DESORBENT MATERIALS

| Test | Desorbent | Temperature, °C. | Selectivity(B), beta-pinene/ alpha-pinene | Volume of desorbent to desorb beta-pinene, cc.[1] |
|---|---|---|---|---|
| A | 30 vol. percent hexene-1, 70 vol. percent iso-pentane. | 45 | 4.35 | 156 |
| B | do | 54 | 4.30 | 141 |
| C | 50 vol. percent hexene-1, 50 vol. percent iso-pentane. | 54 | 3.67 | 107.5 |
| D | 100 vol. percent hexene-1 | 54 | 2.79 | 61.4 |

[1] Cc. desorbent pumped between center of tracer envelope to extinction of beta-pinene.

The selectivity values shown for the four tests demonstrate first of all the adsorbent's ability to selectively adsorb beta-pinene with respect to alpha-pinene thereby making separation of the isomers possible. All of the selectivities are well above 2 as compared to the relative volatility factor of 1.3 that exists between the two isomers. The data also indicates the effect of temperatures on the rate of desorption of the selectively adsorbed beta-pinene. Tests A and B used the same desorbent material (30 vol. percent hexene-1 and 70 vol. percent iso-pentane) but Test A was conducted at 45° C. and Test B at a higher temperature of 54° C. At the increased temperature, 141 cc. of desorbent were required to desorb beta-pinene as compared to 156 cc. of desorbent at the lower temperature. The data also shows that at the same temperature, increasing the vol. percent of hexene-1 in the desorbent blend from 30 vol. percent in Test B to 50 vol. percent in Test C to 100 vol. percent in Test D improved the efficiency of desorption of beta-pinene. The volume of desorbent decreased from 141 cc. to 107.5 cc. to 61.4 cc. respectively for Tests B, C and D but at the same time selectivities decreased from 4.30 to 3.67 to 2.79 respectively.

EXAMPLE II

In this example pulse test results are presented to show the effects of various substrates on the performance characteristics of a particular adsorbent.

For this example another batch of adsorbent similar to that described in Example 1 was produced except that it was dried at 500° C. for 1 hour before any portions of the batch were utilized in the pulse test apparatus. All liquid substrates were added to 85 cc. portions of the dried adsorbent and allowed to equilibrate for about 12 hours before being loaded into the testing apparatus.

The feed mixture utilized contained 5 vol. percent n-nonane, 17 vol. percent beta-pinene and 78 vol. percent alpha-pinene and was injected via a sample loop into the test column in pulses of 3.5 cc. each. The desorbent material used consisted of a blend of 30 vol. percent hexene-1 and 70 vol. percent iso-pentane.

The adsorbent column was maintained at 52° C. with constant pressure of 60 p.s.i.g. during the entire operation for each pulse test. The column effluent was sampled every 2.5 minutes by an automatic sampling chromatograph and analyzed by the on-stream chromatographic equipment.

From information derived from the chromatographic traces in the manner previously described the effect of various substrates on adsorbent performance characteristics were noted. Results for various substrates are shown in Table 3.

TABLE 3.—PINENE SEPARATION PULSE TEST RESULTS WITH VARIOUS ABSORBENT SUBSTRATES

| Test | Substrate per 85 cc. absorbent | Selectivity (B), beta-pinene/alpha-pinene | Volume of desorbent to desorb beta-pinene [1] | Tailing of alpha-pinene into beta-pinene |
|---|---|---|---|---|
| 1 | Dry | 3.61 | 143 | Yes. |
| 2 | 1 cc. water | 3.04 | 85 | Yes. |
| 3 | 1 cc. methanol | 3.20 | 116 | Yes. |
| 4 | 1 cc. ethanol | 3.25 | 113 | Yes. |
| 5 | 1 cc. butanol-1 | 3.46 | 112 | Yes. |
| 6 | 0.25 cc. benzene | 3.57 | 113 | No. |
| 7 | 0.5 cc. benzene | 3.48 | 106 | No. |
| 8 | 1.0 cc. benzene | 3.03 | 94 | No. |
| 9 | 2.0 cc. benzene | 2.76 | 76 | No. |

[1] Cc. of desorbent pumped between center of tracer envelope to extinction of beta-pinene.

Test 1, which used a dry adsorbent sample with no substrate had the highest selectivity of 3.61 but it also required the highest amount (143 cc.) of desorbent to desorb beta-pinene and tailing of alpha-pinene into beta-pinene was exhibited.

The presence of water in Test 2 reduced the desorbent requirement and the selectivity but tailing was still present.

The use of alcohols as substrates in Tests 3, 4 and 5 improved the adsorbent selectivities over that obtained with water as a substrate in Test 2 but the desorbent requirement of each was higher than that of Test 2 and tailing of alpha-pinene into beta-pinene was still present in each.

Tests 6, 7, 8 and 9 show that the use of benzene as a substrate in amounts of from 0.25 to 2.0 cc. of benzene per 85 cc. of adsorbent eliminated the tailing problem. When used in amounts of from 0.25 to 0.50 cc. benzene per 85 cc. adsorbent the selectivities obtained approached the highest selectivity which was obtained with dry adsorbent. These tests show also that as the amount of benzene substrate was increased from 0.25 to 2.0 cc. the desorbent requirements decreased, indicating improved desorption rates from that obtained with the dry adsorbent. At the same time, however, selectivities decreased as the amount of benzene substrate increased. Thus, although tailing is eliminated at low concentrations, the test data indicate that there is a preferred range of benzene substrate concentration on the adsorbent to obtain the optimum balance of good selectivities coupled with minimum desorbent requirement. The preferred concentration range is from about 0.05 to about 0.5 wt. percent of the dry adsorbent.

I claim as my invention:

1. A process for separating pinene isomers from a feed mixture containing pinene isomers which process comprises contacting said mixture with a crystalline aluminosilicate adsorbent selected from the group consisting of type X structured and type Y structured zeolites containing one or more selected cations at the exchangeable cationic sites within said zeolite and containing an aromatic hydrocarbon substrate selected from the group consisting of benzene and benzene homologues having a boiling point less than that of the pinene isomers, thereby selectively adsorbing, at adsorption conditions, said isomer from said mixture and thereafter recovering the selectively adsorbed isomer.

2. The process of Claim 1 further characterized in that said selectively adsorbed isomer comprises beta-pinene.

3. The process of Claim 1 further characterized in that said adsorbent contains at least one cation selected from the group consisting of lithium, sodium, potassium, beryllium, magnesium, calcium, strontium, barium, and sodium.

4. The process of Claim 3 further characterized in that said adsorbent contains at least one cation selected from the group consisting of potassium, barium and sodium.

5. A process for separating beta-pinene from a feed mixture comprising pinene isomers which process comprises the steps of:
(a) contacting said mixture at adsorption conditions with a crystalline aluminosilicate selected from the group consisting of type X and type Y zeolites containing a selected cation or cations at the exchangeable cationic sites within said zeolite and containing, at an effective concentration, an aromatic hydrocarbon substrate selected from the group consisting of benzene and benzene homologues having a boiling point less than that of the pinene isomer, thereby selectively adsorbing beta-pinene;
(b) withdrawing from the adsorbent bed a stream comprising less selectively adsorbed isomer in the feed;
(c) contacting the adsorbent at desorption conditions with a desorbent material to effect the removal of beta-pinene from the adsorbent; and,
(d) withdrawing from the adsorbent a stream comprising desorbent material and said beta-pinene.

6. The process of Claim 5 further characterized in that said feed mixture comprises turpentine.

7. The process of Claim 5 further characterized in that said adsorbent contains at least one cation selected from the group consisting of potassium, sodium, barium and combinations thereof.

8. The process of Claim 7 further characterized in that said adsorbent contains potassium cations at the cationic exchangeable sites within the adsorbent.

9. The process of Claim 7 further characterized in that said adsorbent contains sodium cations at the cationic exchangeable sites within the adsorbent.

10. The process of Claim 7 further characterized in that said adsorbent contains barium and potassium at the cationic exchangeable sites within the adsorbent.

11. The process of Claim 5 further characterized in that said aromatic hydrocarbon substrate is benzene.

12. The process of Claim 5 further characterized in that said effective concentration is from about 0.05 to about 0.5 wt. percent of the adsorbent.

13. The process of Claim 5 further characterized in that said desorbent material contains said substrate in amounts sufficient to maintain said effective concentration.

14. The process of Claim 5 further characterized in that said desorbent material comprises linear olefins having a different boiling point than that of the feed mixture.

15. The process of Claim 14 further characterized in that said linear olefins have a lower boiling point than that of the feed mixture.

16. The process of Claim 5 further characterized in that said desorbent material comprises a mixture of linear olefins and paraffins having a different boiling point than that of the feed mixture.

17. The process of Claim 16 further characterized in that said linear olefins and said paraffins both have lower boiling points than that of the fed mixture.

18. The process of Claim 5 further characterized in that said adsorption and desorption conditions include temperatures within the range of from about 70° F. to about 150° F. and pressures from about atmospheric to about 500 p.s.i.g.

19. A process for separating beta-pinene from a feed mixture comprising beta-pinene and alpha-pinene which process comprises the steps of:
  (a) contacting the feed, at adsorption conditions with a type X structured zeolite containing potassium at the exchangeable cationic sites within said zeolite and containing, at an effective concentration of from about 0.05 to about 0.5 wt. percent of the adsorbent, an aromatic hydrocarbon substrate selected from the group comprising benzene and benzene homologues having a boiling point less than that of the pinene isomers, thereby selectively adsorbing beta-pinene;
  (b) withdrawing from the adsorbent bed a stream comprising less selectively adsorbed alpha-pinene;
  (c) contacting the adsorbent at desorption conditions with a desorbent material comprising a mixture of linear olefins and paraffins each having a lower boiling point than that of the feed mixture to effect the removal of beta-pinene from the adsorbent; and,
  (d) withdrawing from the adsorbent a stream comprising desorbent material and said beta-pinene.

20. The process of Claim 19 further characterized in that said feed mixture comprises turpentine.

21. The process of Claim 19 further characterized in that said aromatic hydrocarbon substrate is benzene.

22. The process of Claim 19 further characterized in that said adsorption conditions and said desorption conditions include temperatures within the range of from about 70° F. to about 150° F. and pressures from about atmospheric to about 500 p.s.i.g.

23. The process of Claim 19 further characterized in that said desorbent material contains said substrate in amounts sufficient to maintain said effective concentration.

References Cited
UNITED STATES PATENTS

| | | | |
|---|---|---|---|
| 3,106,593 | 10/1963 | Benesi et al. | 260—681.5 |
| 3,140,322 | 7/1964 | Frilette et al. | 260—667 |
| 3,558,732 | 1/1971 | Neuzil | 260—674 |
| 3,696,164 | 10/1972 | Davis | 260—675.5 |
| 3,700,746 | 10/1972 | Takacs | 260—675.5 |
| 3,706,812 | 12/1972 | DeRosset et al. | 260—674 SA |
| 3,780,125 | 12/1973 | Takacs | 260—675.5 |

DELBERT E. GANTZ, Primary Examiner

G. E. SCHMITKONS, Assistant Examiner

U.S. Cl. X.R.

208—Dig. 2, 310; 252—455 Z; 260—674 SA